United States Patent
Tanouchi et al.

(10) Patent No.: US 11,223,194 B2
(45) Date of Patent: Jan. 11, 2022

(54) MOTOR CONTROL APPARATUS INCLUDING PROTECTION MECHANISM

(71) Applicant: Fanuc Corporation, Yamanashi (JP)

(72) Inventors: Hironao Tanouchi, Yamanashi (JP); Naoki Masuda, Yamanashi (JP); Masato Watanabe, Yamanashi (JP); Hirokazu Nagai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/953,688

(22) Filed: Nov. 20, 2020

(65) Prior Publication Data

US 2021/0184457 A1 Jun. 17, 2021

(30) Foreign Application Priority Data

Dec. 16, 2019 (JP) .............................. JP2019-226651

(51) Int. Cl.
*H02H 7/08* (2006.01)
*H02P 29/032* (2016.01)
(Continued)

(52) U.S. Cl.
CPC ........... *H02H 7/0833* (2013.01); *H02P 27/08* (2013.01); *H02P 29/0241* (2016.02); *H02P 29/032* (2016.02)

(58) Field of Classification Search
CPC .... H02P 29/02; H02P 29/024; H02P 29/0241; H02P 29/032; H02P 29/028; H02P 27/04; H02P 27/06; H02P 27/00; H02P 1/00; H02P 1/021; H02P 1/023; H02P 1/16; H02P 1/163; H02P 1/18; H02P 1/20; H02P 1/26; H02P 1/42; H02P 1/46; H02P 1/465; H02P 3/00; H02P 3/12; H02P 3/14; H02P 3/18; H02P 3/22; H02P 6/00; H02P 6/157; H02P 6/182; H02P 6/24; H02P 7/292; H02H 7/0833
See application file for complete search history.

(56) References Cited

U.S. PATENT DOCUMENTS 7,479,756 B2 * 1/2009 Kasunich ............. H02H 7/1216
318/731

FOREIGN PATENT DOCUMENTS

| JP | 01185186 A | 7/1989 |
|---|---|---|
| JP | 09103088 A | 4/1997 |
| JP | 2004103031 A | 4/2004 |

* cited by examiner

*Primary Examiner* — Antony M Paul
(74) *Attorney, Agent, or Firm* — RatnerPrestia (57) ABSTRACT

A motor control apparatus includes: a main power conversion circuit that converts power that is supplied from a power supply into alternating current power for driving a motor, and outputs the alternating current power; a counter electromotive force protection circuit including a rectifier unit that rectifies alternating current power based on counter electromotive force of the motor and outputs direct current power, a short-circuit unit that short-circuits terminals on a direct current output side of the rectifier unit, and an alarm signal output unit that outputs an alarm signal at occurrence of an abnormality; a monitoring unit that monitors whether the alarm signal is output from the alarm signal output unit; and a protection operation unit that performs a protection operation for preventing damage to the main power conversion circuit when the monitoring unit determines that the alarm signal is output from the alarm signal output unit.

8 Claims, 5 Drawing Sheets

(51) Int. Cl.
*H02P 27/08* (2006.01)
*H02P 29/024* (2016.01)

MOTOR CONTROL APPARATUS INCLUDING PROTECTION MECHANISM

CROSS-REFERENCE TO RELATED APPLICATIONS

This application is a new U.S. Patent Application that claims benefit of Japanese Patent Application No. 2019-226651, filed Dec. 16, 2019, the disclosure of which is incorporated herein by reference in its entirety for all purposes.

BACKGROUND OF THE INVENTION

1. Field of Invention

The present invention relates to a motor control apparatus including a protection mechanism.

2. Description of the Related Art

In a motor control apparatus that controls driving of a motor in a machine tool, forging machinery, an injection molding machine, industrial machinery, or various robots, a motor is driven with alternating current power converted from power supplied from a power supply. A main power conversion circuit that generates alternating current power for driving the motor includes, for example, a converter and an inverter. More specifically, alternating current power supplied from an alternating current power supply is converted into direct current power in the converter and output to a DC link, the direct current power in the DC link is further converted into alternating current power in the inverter, and the alternating current power is supplied as motor driving power to the motor. Herein, the "DC link" refers to a circuit portion that electrically connects a direct current output side of the converter and a direct current input side of the inverter, and may also be differently referred to as a "DC link portion", a "direct current link", a "direct current link portion", a "direct current generating line", a "direct current intermediate circuit", or the like. The DC link is provided with a DC link capacitor.

When an abnormality occurs in the motor control apparatus, a machine provided with the motor control apparatus, the alternating current power supply that supplies power to the motor control apparatus, or the like, the motor control apparatus urgently stops the motor. At this time, energy on the basis of counter electromotive force is generated in the motor. The energy generated in the motor is regenerated into the alternating current power supply or regenerated into a regeneration load (regeneration resistor) provided in the DC link. However, when the motor is large or the motor rotates at a high speed, the energy on the basis of the counter electromotive force generated when the motor is urgently stopped is extremely large, and the energy cannot be regenerated into the alternating current power supply or the regeneration load. Thus, some kind of measures is necessary.

For example, as described in Japanese Unexamined Patent Publication No. H01(1989)-185186, a servo system protection device for an abnormal current has been known that includes: current command means (102, 104) for commanding a current according to a position command and rotational angle position information transmitted from a rotational angle position detector including a servo-motor; current control means (106) for receiving the current command and generating a PWM signal; energization control means (110, 112, 114, 116, 118, 120) for receiving the PWM signal and controlling a driving current passing through the servo-motor; current detection means (124, 126) for detecting the driving current; and phase monitoring means (28) for receiving the detected driving current information and the rotational angle position information of the servo-motor, determining whether a phase of the driving current corresponds to the rotational angle position, and also interrupting, when the phase does not correspond to the rotational angle position, the PWM signal, and the current control means receives the other driving current information of the current command and sends the PWM signal.

For example, as described in Japanese Unexamined Patent Publication No. H09(1997)-103088, a motor driving circuit that supplies driving power to a motor has been known that is formed of a differential amplifier including a first input to which a reference voltage is applied, and a resistor that is connected between the differential amplifier and the motor and has the motor side connected to a second input of the differential amplifier, and is provided with an overcurrent detection circuit that detects a voltage drop value due to the resistor in the motor driving circuit operating in such a way as to supply power at a predetermined voltage to the motor, and outputs a signal indicating that an overcurrent flows through the motor when the voltage drop value exceeds a predetermined voltage value.

For example, as described in Japanese Unexamined Patent Publication No. 2004-103031, an abnormality detection/diagnosis method of a servo control system has been known that detects a transmission-side connection state of a plurality of detector reception circuits when a power supply is turned on, thus automatically determines a detector type name being actually connected, and issues a parameter abnormal alarm when a detector type designated by a parameter is different from that of the detector being actually connected.

SUMMARY OF INVENTION

In a case where energy on the basis of counter electromotive force generated when a motor is urgently stopped is large, the energy cannot be regenerated into an alternating current power supply and a regeneration load, and a DC link voltage significantly increases. Thus, a counter electromotive force protection circuit that consumes the energy on the basis of the counter electromotive force may be provided. However, even with the counter electromotive force protection circuit being provided, the energy on the basis of the counter electromotive force cannot be consumed when the counter electromotive force protection circuit is faulty, and the DC link voltage significantly increases. When the DC link voltage exceeds a withstanding voltage of a DC link capacitor, the DC link capacitor breaks, and, as a result of this, a main power conversion circuit itself also breaks, which is extremely dangerous. Therefore, a motor control apparatus that can prevent breakage of the DC link capacitor and the main power conversion circuit due to occurrence of an abnormality of the counter electromotive force protection circuit is desired.

According to one aspect of the present disclosure, a motor control apparatus includes: a main power conversion circuit that converts power that is supplied from a power supply into alternating current power for driving a motor, and outputs the alternating current power; a counter electromotive force protection circuit provided between an alternating current output side of the main power conversion circuit and the motor, the counter electromotive force protection circuit including a rectifier unit that rectifies alternating current power based on counter electromotive force of the motor and outputs direct current power, a short-circuit unit that short-circuits terminals on a direct current output side of the rectifier unit, and an alarm signal output unit that outputs an alarm signal at occurrence of an abnormality; a monitoring unit that monitors whether the alarm signal is output from the alarm signal output unit; and a protection operation unit that performs a protection operation for preventing damage to the main power conversion circuit when the monitoring unit determines that the alarm signal is output from the alarm signal output unit.

BRIEF DESCRIPTION OF THE DRAWINGS

The present invention will be more clearly understood with reference to the following accompanying drawings.

DETAILED DESCRIPTION

A motor control apparatus including a protection mechanism will be described with reference to the following drawings. A scale is appropriately changed in the drawings in order to facilitate understanding. An aspect illustrated in the drawing is one example for implementation, and the present invention is not limited to the illustrated embodiment.

Figure 1:
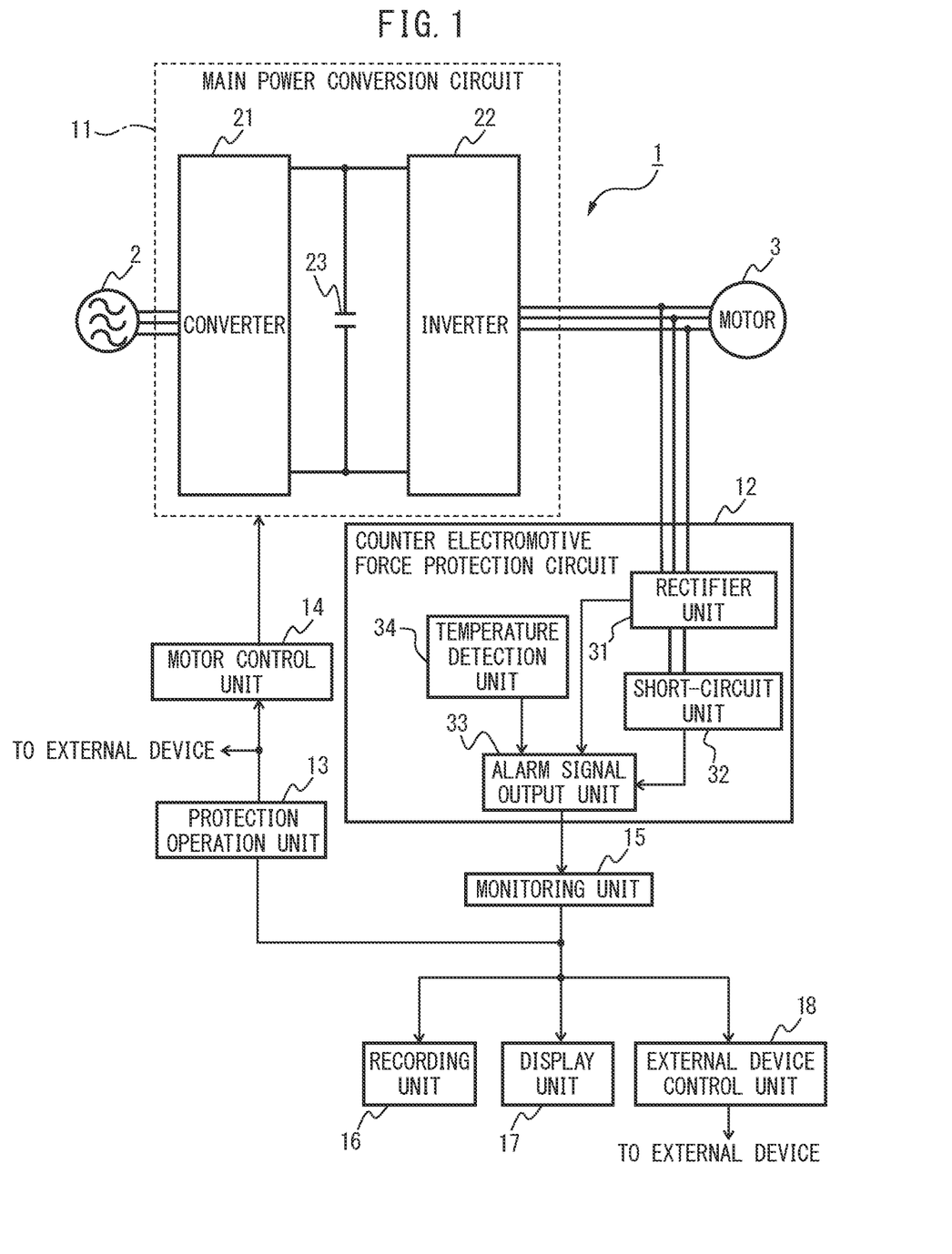
FIG. 1 is a diagram illustrating a motor control apparatus according to one embodiment of the present disclosure.
Figure 2:
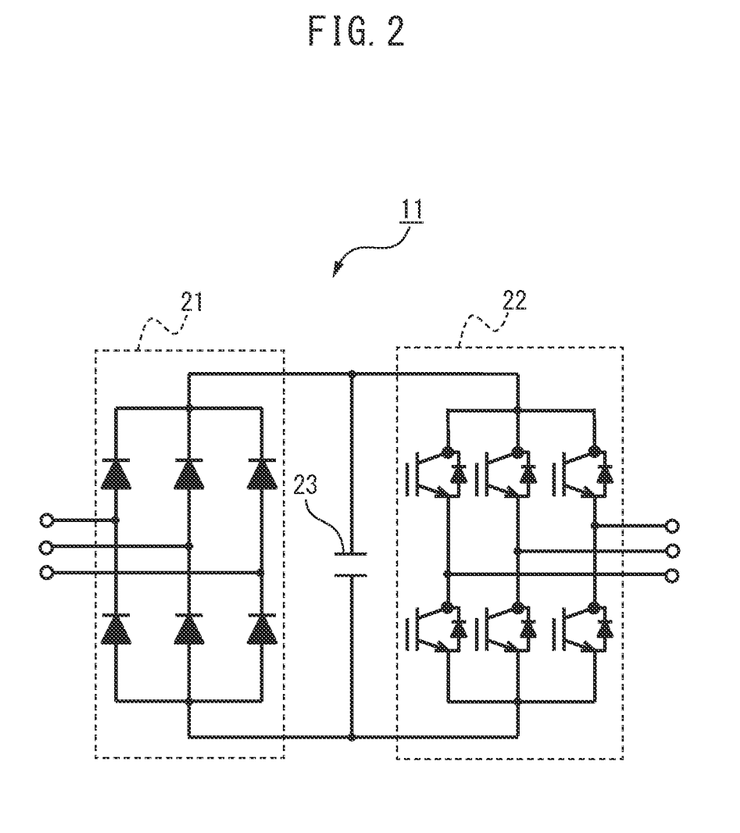
FIG. 2 is a circuit diagram illustrating one example of a main power conversion circuit including a converter and an inverter that are each formed of a three-phase full-bridge circuit.

FIG. 1 is a diagram illustrating a motor control apparatus according to one embodiment of the present disclosure. Further, FIG. 2 is a circuit diagram illustrating one example of a main power conversion circuit including a converter and an inverter that are each formed of a three-phase full-bridge circuit.

As one example, a case where a motor control apparatus 1 controls a motor 3 will be described. In the present embodiment, a type of the motor 3 is not particularly limited, and the motor 3 may be, for example, an induction motor or a synchronous motor. Further, the number of phases of the motor 3 may be, for example, three phases or a single phase. In the illustrated example, it is assumed that the motor 3 includes three phases. A machine provided with the motor 3 includes, for example, a machine tool, a robot, forging machinery, an injection molding machine, industrial machinery, various electric appliances, a train, a car, an aircraft, and the like.

As illustrated in FIG. 1, the motor control apparatus 1 according to one embodiment of the present disclosure includes a main power conversion circuit 11, a counter electromotive force protection circuit 12, a monitoring unit 15, and a protection operation unit 13. Further, the motor control apparatus 1 includes a motor control unit 14, a recording unit 16, a display unit 17, and an external device control unit 18.

The main power conversion circuit 11 converts power that is supplied from a power supply into alternating current power, and outputs the alternating current power as power for driving the motor 3. In the example illustrated in FIG. 1, the main power conversion circuit 11 includes a converter 21, an inverter 22, and a DC link capacitor 23.

An alternating current power supply 2 is connected to an alternating current input side of the converter 21. The number of phases of the alternating current power supply 2 may be, for example, three phases or a single phase. As one example of the alternating current power supply 2, there are a three-phase alternating current 400 V power supply, a three-phase alternating current 200 V power supply, a three-phase alternating current 600 V power supply, a single-phase alternating current 100 V power supply, and the like. In the examples illustrated in FIGS. 1 and 2, it is assumed that the alternating current power supply 2 includes three phases. Note that an alternating current reactor, an AC line filter, an electromagnetic contactor, a breaker, and the like may be provided between the converter 21 and the alternating current power supply 2, which are not illustrated herein. The converter 21 is a rectifier that converts alternating current power input from the alternating current input side into direct current power, and outputs the direct current power to a DC link on a direct current output side. In the examples illustrated in FIGS. 1 and 2, since it is assumed that the alternating current power supply 2 is a three-phase alternating current power supply, the converter 21 is formed of a three-phase full-bridge circuit. When single-phase alternating current power is supplied from the alternating current power supply 2, the converter 21 functions as a single-phase bridge circuit. As an example of the converter 21, there are a diode rectifier, a 120-degree energization system rectifier, a PWM switching control system rectifier, and the like. In the example illustrated in FIG. 2, a diode rectifier formed of a full-bridge circuit of a diode is illustrated. Further, for example, when the converter 21 is a 120-degree energization system rectifier and a PWM switching control system rectifier, the converter 21 is formed of a switching device and a full-bridge circuit of a diode connected in reverse parallel to the switching device, and performs power conversion in two AC-DC ways by each switching device being subjected to ON/OFF control in accordance with a driving command received from the motor control unit 14. As an example of the switching device when the converter 21 is a 120-degree energization system rectifier and a PWM switching control system rectifier, there are an IGBT, an FET, a thyristor, a gate turn-off thyristor (GTO), a transistor, and the like, but the switching device may be another semiconductor device.

The DC link that connects the direct current output side of the converter 21 and a direct current input side of the inverter 22 is provided with the DC link capacitor 23. The DC link capacitor 23 has a function of accumulating direct current power used for generating alternating current power by the inverter 22, and a function of suppressing a pulsation of a direct current output of the converter 21. As an example of the DC link capacitor 23, there are, for example, an electrolytic capacitor, a film capacitor, and the like. Note that the DC link may be provided with a regeneration load (regeneration resistor) for consuming regeneration energy from the motor.

The inverter 22 is connected to the converter 21 via the DC link, converts the direct current power in the DC link into alternating current power for motor driving, and outputs the alternating current power. In the examples illustrated in FIGS. 1 and 2, since it is assumed that the motor 3 is a three-phase alternating current motor, the inverter 22 is formed of a three-phase full-bridge circuit. When the motor 3 is a single-phase alternating current motor, the inverter 22 is formed of a single-phase full-bridge circuit. As illustrated in FIG. 2, in the inverter 22 formed of the three-phase full-bridge circuit, the switching device connected in reverse parallel to the diode is provided in each of an upper arm on a high potential side and a lower arm on a low potential side. As an example of the switching device, there are an IGBT, an FET, a thyristor, a GTO, a transistor, and the like, but the switching device may be another semiconductor device. The switching device is subjected to ON/OFF control according to, for example, a PWM control system on the basis of a driving command of the motor control unit 14, and thus the inverter 22 converts the direct current power in the DC link into the alternating current power for motor driving and outputs the alternating current power. A speed, a torque, or a position of a rotor of the motor 3 is controlled on the basis of the alternating current power supplied from the inverter 22. Note that the motor control unit 14 appropriately performs PWM control on an ON/OFF operation of the switching device, and thus the inverter 22 can also regenerate power generated in the motor 3 into the alternating current power supply 2 or the DC link. When power is regenerated into the DC link, a regeneration load (regeneration resistor) is provided in the DC link, and energy regenerated from the motor 3 via the inverter 22 is consumed by the regeneration load.

Note that a power supply that supplies power to the main power conversion circuit 11 may be a direct current power supply (not illustrated) such as a battery, instead of the alternating current power supply 2, and, in this case, the converter 21 is omitted.

The motor control unit 14 controls an operation of the motor 3. Since a speed, a torque, or a position of a rotor of the motor 3 is controlled on the basis of alternating current power supplied from the main power conversion circuit 11, the control of the motor 3 by the motor control unit 14 is achieved by controlling a power conversion operation of the main power conversion circuit 11 in the end. The motor control unit 14 performs ON/OFF control on the switching device of the inverter 22 in the main power conversion circuit 11. As a control system of the switching device of the inverter 22 by the motor control unit 14, there is the PWM control system, for example. The motor control unit 14 performs ON/OFF control on the switching device on the basis of a rotation speed (speed feedback) of the motor 3, a current (current feedback) of the motor 3, a predetermined torque command, an operation program of the motor 3, and the like, and controls the power conversion operation of the inverter 22. A speed, a torque, or a position of a rotor of the motor 3 is controlled on the basis of, for example, variable-voltage and variable-frequency alternating current power supplied from the inverter 22. Note that the configuration of the motor control unit 14 described herein is merely one example, and the configuration of the motor control unit 14 may be defined by including terms such as a position command generation unit, a position control unit, a speed control unit, a current control unit, a torque command generation unit, and a switching command generation unit, for example.

Note that, when the converter 21 is a PWM switching control system rectifier, the motor control unit 14 also performs ON/OFF control on the switching device in the converter 21 according to the PWM control system. Further, when the converter 21 is a 120-degree energization system rectifier, every time a voltage of each phase of the three-phase alternating current power supply is switched, the motor control unit 14 turns on a switching device in an upper arm in a phase having a maximum voltage of the three-phase alternating current power supply among phases, and also turns on a switching device in a lower arm in a phase having a minimum voltage of the three-phase alternating current power supply, and thus direct current power is regenerated into the three-phase alternating current power supply.

The counter electromotive force protection circuit 12 is provided between an alternating current output side of the inverter 22 in the main power conversion circuit 11 and the motor 3. The counter electromotive force protection circuit 12 includes a rectifier unit 31, a short-circuit unit 32, an alarm signal output unit 33, and a temperature detection unit 34.

The rectifier unit 31 in the counter electromotive force protection circuit 12 is a rectifier that rectifies alternating current power on the basis of counter electromotive force of the motor 3 and outputs direct current power. In the illustrated example, since it is assumed that the motor 3 is a three-phase alternating current motor, the rectifier unit 31 is formed of a three-phase full-bridge circuit. When the motor 3 is a single-phase alternating current motor, the rectifier unit 31 is formed of a single-phase full-bridge circuit. As an example of the rectifier unit 31, there are a diode rectifier, a 120-degree energization system rectifier, a PWM switching control system rectifier, and the like.

The short-circuit unit 32 in the counter electromotive force protection circuit 12 includes a switch mechanism for short-circuiting terminals on a direct current output side of the rectifier unit 31 in a case where energy on the basis of counter electromotive force generated when the motor 3 is stopped needs to be consumed, and not short-circuiting the terminals in the other case (i.e., when the energy on the basis of the counter electromotive force does not need to be consumed). For example, when the motor 3 is urgently stopped, the energy on the basis of the counter electromotive force generated is extremely large. In order to consume such an extremely large energy on the basis of the counter electromotive force, the short-circuit unit 32 in the counter electromotive force protection circuit 12 short-circuits the terminals on the direct current output side of the rectifier unit 31. When a situation where the motor 3 is urgently stopped occurs, an urgency stop signal is generally output from an external device, and thus the short-circuit unit 32 in the counter electromotive force protection circuit 12 may short-circuit the terminals on the direct current output side of the rectifier unit 31 in conjunction with the output of the urgency stop signal from the external device.

A switching operation by the short-circuit unit 32 in the counter electromotive force protection circuit 12 may be controlled by the motor control unit 14, for example, or a control unit (not illustrated) different from the motor control unit 14 may be provided. When the short-circuit unit 32 does not short-circuit the terminals on the direct current output side of the rectifier unit 31, nothing is connected between the terminals on the direct current output side of the rectifier unit 31, and thus the rectifier unit 31 does not perform the operation of rectifying alternating current power and outputting direct current power. The rectifier unit 31 performs the operation of rectifying alternating current power and outputting direct current power only when the short-circuit unit 32 short-circuits the terminals on the direct current output side of the rectifier unit 31. As an example of the switch mechanism, there is a semiconductor device such as an IGBT, an FET, a thyristor, a GTO, or a transistor, a mechanical switch such as a relay, or the like.

Figure 3:
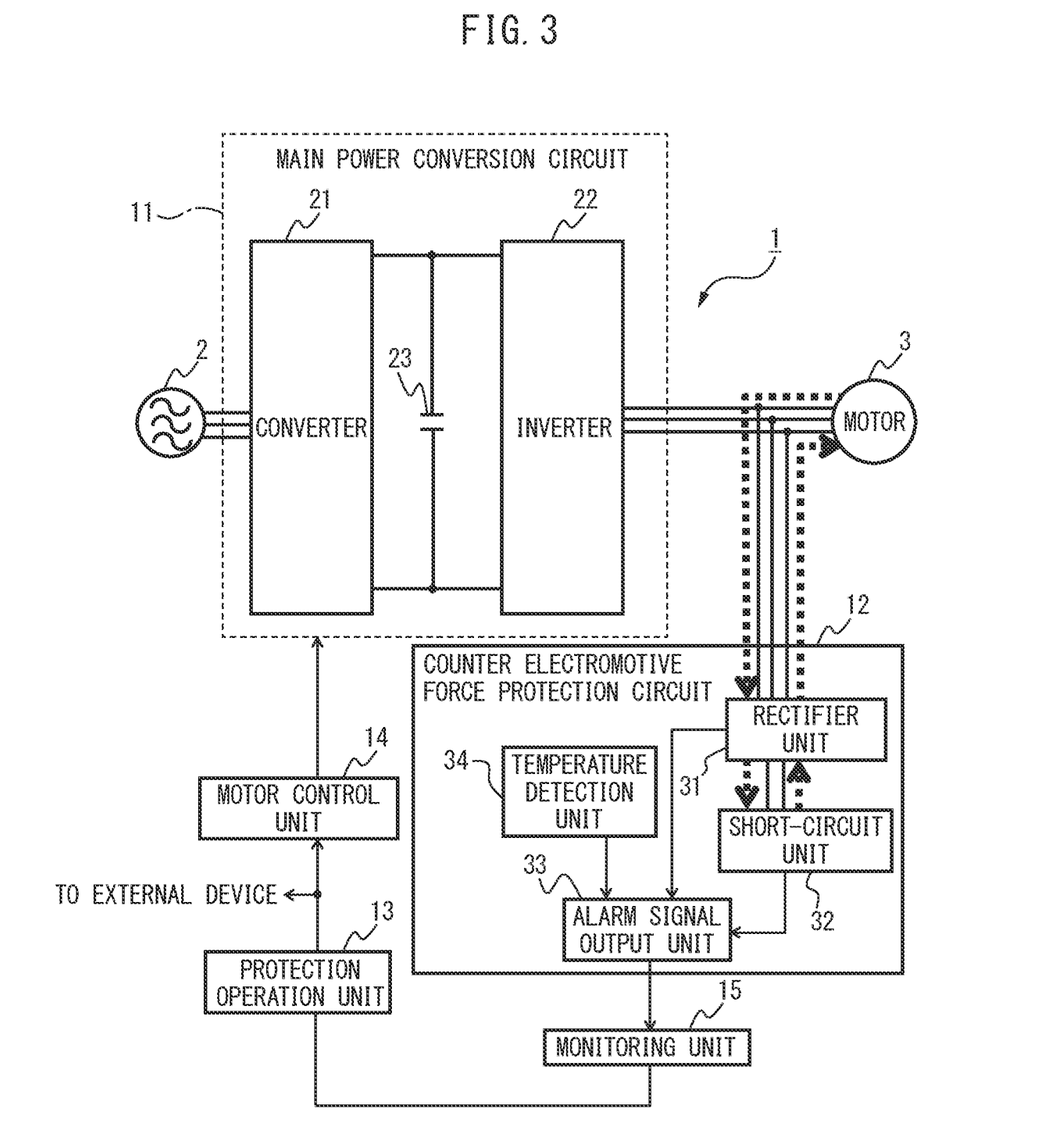
FIG. 3 is a diagram illustrating an operation of a counter electromotive force protection circuit in the motor control apparatus according to one embodiment of the present disclosure.

FIG. 3 is a diagram illustrating an operation of the counter electromotive force protection circuit in the motor control apparatus according to one embodiment of the present disclosure. In FIG. 3, the recording unit 16, the display unit 17, and the external device control unit 18 are omitted. Which phase of a diode a current flows through among diodes in the rectifier unit 31 changes depending on a size of a phase voltage of each phase of the motor 3. For example, FIG. 3 illustrates a flow of a current at a certain moment.

As long as the counter electromotive force protection circuit 12 normally operates, all the energy on the basis of the counter electromotive force generated when the motor 3 is urgently stopped is consumed by motor windings having phases in a short-circuit state via the rectifier unit 31 and the short-circuit unit 32 in the counter electromotive force protection circuit 12 to stop the motor 3, and a DC link voltage does not significantly increase. However, when some sort of abnormality occurs in the counter electromotive force protection circuit 12, the short-circuit unit 32 does not short-circuit the terminals on the direct current output side of the rectifier unit 31, and there is also a possibility that the energy on the basis of the counter electromotive force is not consumed. In this case, when the DC link voltage gradually increases and exceeds a withstanding voltage of the DC link capacitor 23, the DC link capacitor 23 breaks, and, as a result of this, the main power conversion circuit 11 itself also breaks. Thus, in the present embodiment, the protection operation unit 13 described below performs a protection operation for preventing damage to the DC link capacitor 23 and the main power conversion circuit 11.

The alarm signal output unit 33 in the counter electromotive force protection circuit 12 outputs an alarm signal when an abnormality occurs in the counter electromotive force protection circuit 12. Herein, a few examples of the abnormality of the counter electromotive force protection circuit 12 are listed.

As a first abnormality, for example, there is a contact fault of the switch mechanism in the short-circuit unit 32. At occurrence of the contact fault of the switch mechanism in the short-circuit unit 32, the short-circuit unit 32 cannot short-circuit the terminals on the direct current output side of the rectifier unit 31 when the short-circuit unit 32 needs to short-circuit the terminals. The alarm signal output unit 33 outputs the alarm signal in such a case. More specifically, a voltage application unit (not illustrated) that applies a micro voltage between contact terminals of the switch mechanism in the short-circuit unit 32 when the short-circuit unit 32 conceivably short-circuits the terminals on the direct current output side of the rectifier unit 31, and a current determination unit (not illustrated) that determines whether a current flows between the contacts are provided in the counter electromotive force protection circuit 12. The alarm signal output unit 33 outputs the alarm signal in a case where the voltage application unit applies a micro voltage between the contact terminals of the switch mechanism in the short-circuit unit 32 when the short-circuit unit 32 conceivably short-circuits the terminals on the direct current output side of the rectifier unit 31, and, at this time, the current determination unit determines that a current does not flow between the contacts.

As a second abnormality, for example, there is abnormal heat generation of a component in the counter electromotive force protection circuit 12. In a case of the abnormal heat generation of a component in the counter electromotive force protection circuit 12, the short-circuit unit 32 cannot short-circuit the terminals on the direct current output side of the rectifier unit 31 when the short-circuit unit 32 needs to short-circuit the terminals. Particularly, when the switch mechanism in the short-circuit unit 32 is formed of a semiconductor switching device, an operation of the semiconductor switching device becomes unstable due to the abnormal heat generation. The alarm signal output unit 33 outputs the alarm signal in such a case. More specifically, the temperature detection unit 34 and a temperature determination unit (not illustrated) that determines whether a temperature detected by the temperature detection unit 34 exceeds a temperature threshold value are provided in the counter electromotive force protection circuit 12. The alarm signal output unit 33 outputs the alarm signal when the temperature determination unit determines that the temperature detected by the temperature detection unit 34 exceeds the temperature threshold value. The temperature threshold value may be set to a value lower than an allowable temperature of a component in the counter electromotive force protection circuit 12 by approximately a few percent to a dozen percent, for example, in consideration of safety. The numerical example indicated herein is merely one example, and another value may be set. As the allowable temperature of the component in the counter electromotive force protection circuit 12, for example, a value defined as one piece of specification data in a specification table, an instruction manual, or the like of the semiconductor switching device constituting the switch mechanism may be used. Note that the temperature threshold value may be stored in a rewritable storage unit (not illustrated) and be rewritable by external equipment, and can be changed to an appropriate value as necessary even after the temperature threshold value is set once.

As a third abnormality, for example, there is a fault of a control power supply (not illustrated) that supplies driving power to the short-circuit unit 32. In a case where the control power supply breaks down, the short-circuit unit 32 cannot short-circuit the terminals on the direct current output side of the rectifier unit 31 when the short-circuit unit 32 needs to short-circuit the terminals. The alarm signal output unit 33 outputs the alarm signal in such a case. More specifically, a voltage detection unit (not illustrated) that detects a voltage output from the control power supply that supplies driving power of the short-circuit unit 32, and a voltage determination unit (not illustrated) that determines whether the voltage is output from the control power supply are provided in the counter electromotive force protection circuit 12. The alarm signal output unit 33 outputs the alarm signal when the voltage determination unit determines that the voltage is not output from the control power supply.

Figure 4A:
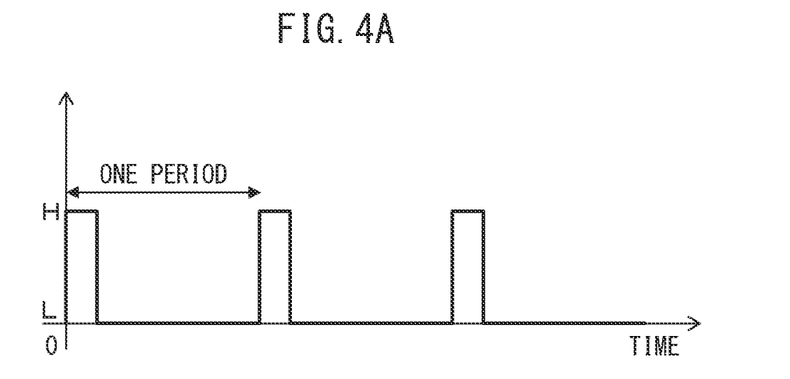
FIGS. 4A, 4B, and 4C are diagrams each illustrating an alarm signal output from an alarm signal output unit in the motor control apparatus according to one embodiment of the present disclosure.
Figure 4B:
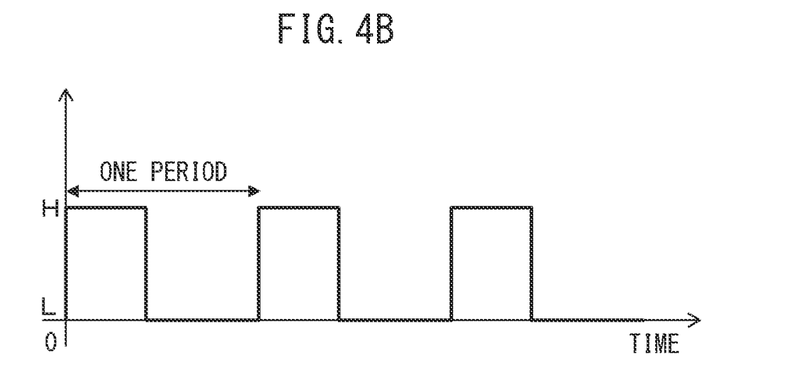
Figure 4C:
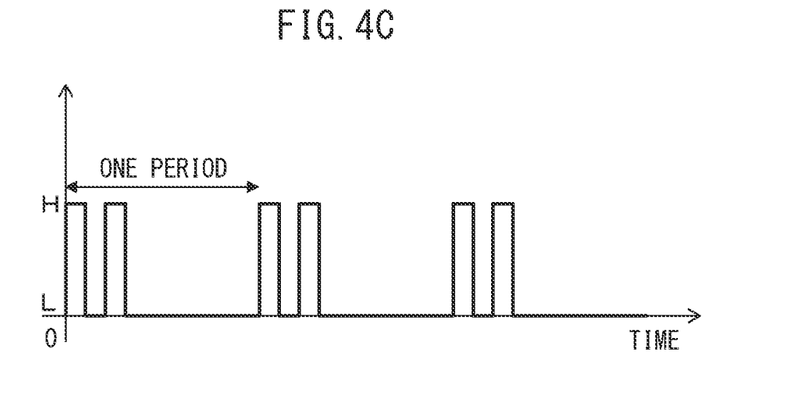

As described above, a plurality of kinds of the abnormalities may occur in the counter electromotive force protection circuit 12. FIGS. 4A, 4B, and 4C are diagrams each illustrating an alarm signal output from the alarm signal output unit in the motor control apparatus according to one embodiment of the present disclosure. By assigning each of a plurality of kinds of alarm signals varying in number of times of switching between H (high) and L (low) and pulse width per one period to the plurality of kinds of the abnormalities of the counter electromotive force protection circuit 12, a content of the abnormality occurring in the counter electromotive force protection circuit 12 can be distinguished. For example, the alarm signal illustrated in FIG. 4A can be assigned to the first abnormality (contact fault of the switch mechanism in the short-circuit unit 32), the alarm signal illustrated in FIG. 4B can be assigned to the second abnormality (abnormal heat generation of a component in the counter electromotive force protection circuit 12), and the alarm signal illustrated in FIG. 4C can be assigned to the third abnormality (fault of the control power supply that supplies driving power to the short-circuit unit 32). Note that a waveform and assignment of the alarm signal illustrated herein is one example, and the other waveform and assignment of the alarm signal may be applicable.

The description returns to FIG. 1 again. The monitoring unit 15 monitors whether the alarm signal is output from the alarm signal output unit 33. A monitoring result by the monitoring unit 15 is transmitted to the protection operation unit 13.

Further, the monitoring unit 15 distinguishes a content of an abnormality occurring in the counter electromotive force protection circuit 12 on the basis of the alarm signal output from the alarm signal output unit 33. A determination result by the monitoring unit 15 is transmitted to the recording unit 16, the display unit 17, and the external device control unit 18.

The protection operation unit 13 performs the protection operation for preventing damage to the DC link capacitor 23 and the main power conversion circuit 11 when the monitoring unit 15 determines that the alarm signal is output from the alarm signal output unit 33.

Note that the protection operation unit 13 may be provided in the motor control unit 14. Herein, a few aspects of the protection operation by the protection operation unit 13 are listed.

In a protection operation according to a first aspect, when the monitoring unit 15 determines that the alarm signal is output from the alarm signal output unit 33, the protection operation unit 13 controls the power conversion operation by the main power conversion circuit 11 in such a way that acceleration/deceleration of the motor 3 is set to a value smaller than a value before the determination by the monitoring unit 15. As described above, the power conversion operation by the inverter 22 in the main power conversion circuit 11 is controlled by the motor control unit 14. Thus, the protection operation for preventing damage to the main power conversion circuit 11 is achieved by controlling the motor control unit 14 by the protection operation unit 13. The protection operation according to the first aspect makes acceleration/deceleration of the motor 3 gentler than that before the determination by the monitoring unit 15. For example, by changing an acceleration constant and a deceleration constant used for arithmetic processing for acceleration control and deceleration control of the motor 3 in the motor control unit 14, acceleration/deceleration of the motor 3 can be changed. The acceleration constant and the deceleration constant are defined as a parameter in a program used for controlling the motor 3 by the motor control apparatus 1. When the monitoring unit 15 determines that the alarm signal is output from the alarm signal output unit 33, the protection operation unit 13 changes the acceleration constant and the deceleration constant used for the arithmetic processing of the motor control unit 14 to a value greater than that set before the determination by the monitoring unit 15. When the acceleration/deceleration control of the motor 3 is performed at the acceleration constant and the deceleration constant set to a greater value, acceleration and deceleration of the motor 3 are further reduced. As a result, a speed change of the motor 3 becomes gentle, and the energy on the basis of the counter electromotive force generated when the motor 3 is stopped becomes small, and thus an increase in the DC link voltage can be suppressed, and the DC link capacitor 23 and the main power conversion circuit 11 can be prevented from breaking.

In a protection operation according to a second aspect, when the monitoring unit 15 determines that the alarm signal is output from the alarm signal output unit 33, the protection operation unit 13 performs control in such a way as to turn off excitation with respect to the motor 3. By turning off excitation with respect to the motor 3, the motor 3 stops at a so-called "free run stop" that the motor 3 rotates by inertia and stops due to a load and friction. In this way, the energy on the basis of the counter electromotive force generated when the motor 3 is stopped becomes small, and thus an increase in the DC link voltage can be suppressed, and the DC link capacitor 23 and the main power conversion circuit 11 can be prevented from breaking.

The protection operations according to the first aspect and the second aspect described above aim to prevent damage to the DC link capacitor 23 and the main power conversion circuit 11. As a modification example of the protection operation, the protection operation unit 13 may cause an external device to perform a protection operation for preventing damage to the motor 3 driven by the motor control apparatus 1, a machine provided with the motor 3, a member connected to the motor 3, and the like.

The recording unit 16, the display unit 17, and the external device control unit 18 are provided for notifying an operator of a content of an abnormality occurring in the counter electromotive force protection circuit 12. As described above, the monitoring unit 15 distinguishes a content of an abnormality occurring in the counter electromotive force protection circuit 12 on the basis of the alarm signal output from the alarm signal output unit 33. Thus, the recording unit 16, the display unit 17, and the external device control unit 18 can record and display a content of an abnormality occurring in the counter electromotive force protection circuit 12 on the basis of a determination result by the monitoring unit 15.

The recording unit 16 records a content of an abnormality that is distinguished by the monitoring unit 15 and occurs in the counter electromotive force protection circuit 12. The recording unit 16 is, for example, a hard disk drive (HDD) attached to the motor control apparatus 1, a solid state drive (SSD), an EEPROM (registered trademark), a DRAM, an SRAM, or the like. Further, for example, on the basis of a content recorded in the recording unit 16, the content may be printed out on a paper or the like at a later date by using a printer, and may be displayed.

The display unit 17 displays a content of an abnormality that is distinguished by the monitoring unit 15 and occurs in the counter electromotive force protection circuit 12. As an example of the display unit 17, there are a display attached to the motor control apparatus 1, a portable terminal, a touch panel, and the like. For example, the display unit 17 can perform display that "contact fault occurs in short-circuit unit in counter electromotive force protection circuit", "abnormal heat generation occurs in component in counter electromotive force protection circuit", "fault occurs in control power supply in counter electromotive force protection circuit", and the like. Note that the above-described display example by the display unit 17 is merely one example, and the display unit 17 may display a content of an abnormality occurring in the counter electromotive force protection circuit 12 on the basis of character expression and illustration other than the display example. As an alternative example, instead of the display unit 17, acoustic equipment that emits sound such as a voice, a speaker, a buzzer, and a chime, for example, may be used for the achievement, and, in this case, the acoustic equipment preferably has no sound while the counter electromotive force protection circuit 12 normally operates. Alternatively, the display by the display unit 17 and acoustic expression by the acoustic equipment may be appropriately combined for the achievement.

The external device control unit 18 performs control in such a way as to cause an external device (not illustrated) to record or display a content of an abnormality that is distinguished by the monitoring unit 15 and occurs in the counter electromotive force protection circuit 12. As the external device, there are, for example, a hard disk drive (HDD) provided outside the motor control apparatus 1, a solid state drive (SSD), an EEPROM (registered trademark), a DRAM, an SRAM, an attached display, a portable terminal, a touch panel, and the like.

An operator can easily recognize occurrence of an abnormality in the counter electromotive force protection circuit 12 and a content of the abnormality on the basis of a recording content by the recording unit 16, a display content by the display unit 17, or a display content or a recording content by the external device. Thus, the operator can immediately perform work such as repair and replacement of the counter electromotive force protection circuit 12, for example. Further, for example, the operator can analyze a content recorded in the recording unit 16 by using an arithmetic processing device, and realize a tendency of an abnormality occurring in the counter electromotive force protection circuit 12.

Note that the motor control apparatus 1 does not necessarily need to include all of the recording unit 16, the display unit 17, and the external device control unit 18 at the same time, and may appropriately include the recording unit 16, the display unit 17, and the external device control unit 18 as necessary.

Figure 5:
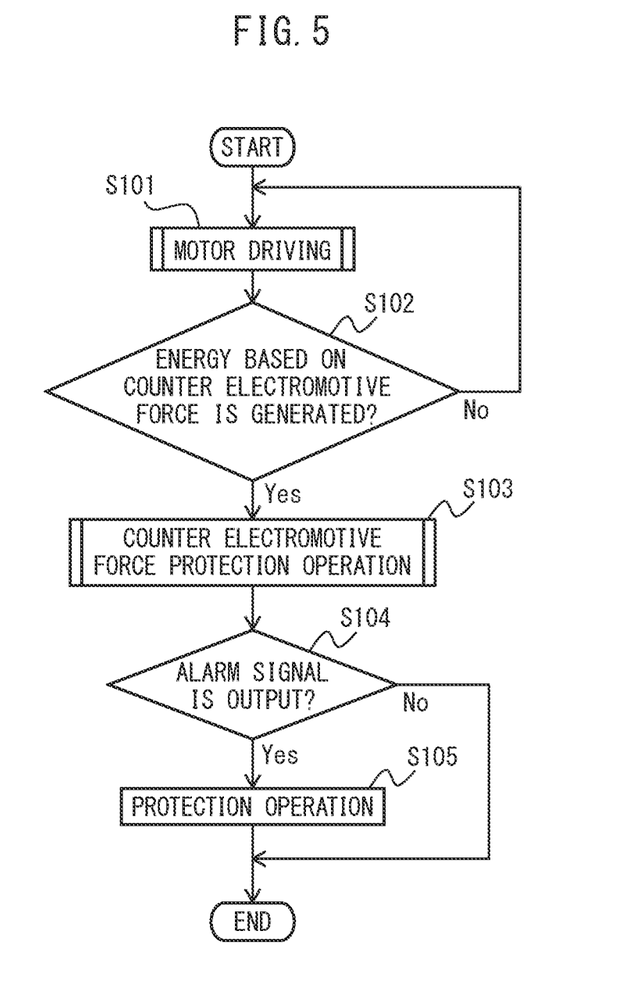
FIG. 5 is a flowchart illustrating an operation flow of the motor control apparatus according to one embodiment of the present disclosure.

FIG. 5 is a flowchart illustrating an operation flow of the motor control apparatus according to one embodiment of the present disclosure.

In step S101, in the motor control apparatus 1 according to the present embodiment, the motor control unit 14 controls the power conversion operation of the inverter 22, and performs driving of the motor 3.

In step S102, the motor control unit 14 determines whether energy on the basis of counter electromotive force generated when the motor 3 is stopped is generated. In step S102, when it is determined that the energy on the basis of the counter electromotive force is generated, processing proceeds to step S103, and, when it is not determined that the energy on the basis of the counter electromotive force is generated, the processing returns to step S101. Note that, as an alternative example of step S102, when the short-circuit unit 32 is caused to short-circuit the terminals on the direct current output side of the rectifier unit 31 in conjunction with the urgency stop signal output from the external device, the motor control unit 14 determines whether the urgency stop signal is output from the external device. In the alternative example, in step S102, when it is determined that the urgency stop signal is output from the external device, the processing proceeds to step S103, and, when it is not determined that the urgency stop signal is output from the external device, the processing returns to step S101.

In step S103, the counter electromotive force protection circuit 12 operates the short-circuit unit 32, and short-circuits the terminals on the direct current output side of the rectifier unit 31. Herein, as long as the counter electromotive force protection circuit 12 normally operates, all the energy on the basis of the counter electromotive force is consumed by the motor windings having the phases in the short-circuit state via the rectifier unit 31 and the short-circuit unit 32 in the counter electromotive force protection circuit 12 to stop the motor 3, and the DC link voltage does not significantly increase. However, when an abnormality occurs in the counter electromotive force protection circuit 12, the terminals on the direct current output side of the rectifier unit 31 are not short-circuited, and the DC link voltage gradually increases. When an abnormality occurs in the counter electromotive force protection circuit 12, the alarm signal output unit 33 outputs the alarm signal.

In step S104, the monitoring unit 15 monitors whether the alarm signal is output from the alarm signal output unit 33. In step S104, when it is determined that the alarm signal is output from the alarm signal output unit 33, the processing proceeds to step S105. On the other hand, in step S104, when it is not determined that the alarm signal is output from the alarm signal output unit 33, all the energy on the basis of the counter electromotive force is consumed by the motor windings having the phases in the short-circuit state via the rectifier unit 31 and the short-circuit unit 32 in the counter electromotive force protection circuit 12 that normally operates to stop the motor 3, and the DC link voltage does not significantly increase, and thus the processing ends.

In step S105, the protection operation unit 13 performs the protection operation for preventing damage to the main power conversion circuit 11. By performing the protection operation, the energy on the basis of the counter electromotive force generated when the motor 3 is stopped becomes small, and thus an increase in the DC link voltage can be suppressed, and the DC link capacitor 23 and the main power conversion circuit 11 can be prevented from breaking. Further, although not illustrated in FIG. 5, the recording unit 16, the display unit 17, or the external device control unit 18 performs processing of recording or displaying a content of an abnormality occurring in the counter electromotive force protection circuit 12. Subsequently, the processing ends.

The protection operation unit 13, the motor control unit 14, the monitoring unit 15, the recording unit 16, the display unit 17, the external device control unit 18, and the alarm signal output unit 33 described above may be constituted in a software program form, for example, or may be constituted by a combination of various electronic circuits and a software program, or may be formed of only various electronic circuits. For example, when they are constituted in a software program form, an arithmetic processing device such as a DSP and an FPGA, for example, is operated in accordance with the software program, and thus the function of each unit described above can be achieved. Alternatively, the protection operation unit 13, the motor control unit 14, the monitoring unit 15, the recording unit 16, the display unit 17, the external device control unit 18, and the alarm signal output unit 33 may be achieved as a semiconductor integrated circuit to which a software program that achieves the function of each unit is written. Alternatively, the protection operation unit 13, the motor control unit 14, the monitoring unit 15, the recording unit 16, the display unit 17, the external device control unit 18, and the alarm signal output unit 33 may be achieved as a recording medium to which a software program that achieves the function of each unit is written. Further, the protection operation unit 13, the motor control unit 14, the monitoring unit 15, the recording unit 16, the display unit 17, the external device control unit 18, and the alarm signal output unit 33 may be provided in a numerical control apparatus of a machine tool, for example, and may be provided in a robot controller that controls a robot.

Further, the temperature detection unit 34 may be formed of a combination of an analog circuit and a digital circuit, or may be formed of only an analog circuit.

Further, the storage unit that stores the temperature threshold value may be formed of a non-volatile memory being electrically deletable and recordable such as, for example, an EEPROM (registered trademark), a random access memory that can perform reading and writing at a high speed such as, for example, a DRAM and an SRAM, or the like.

According to one aspect of the present disclosure, a motor control apparatus that can prevent breakage of a DC link capacitor and a main power conversion circuit due to occurrence of an abnormality of a counter electromotive force protection circuit can be achieved.

The invention claimed is:

1. A motor control apparatus, comprising:
   a main power conversion circuit that converts power that is supplied from a power supply into alternating current power for driving a motor, and outputs the alternating current power;
   a counter electromotive force protection circuit provided between an alternating current output side of the main power conversion circuit and the motor, the counter electromotive force protection circuit including a rectifier unit that rectifies alternating current power based on counter electromotive force of the motor and outputs direct current power, a short-circuit unit that short-circuits terminals on a direct current output side of the rectifier unit, and an alarm signal output unit that outputs an alarm signal at occurrence of an abnormality;
   a monitoring unit that monitors whether the alarm signal is output from the alarm signal output unit; and
   a protection operation unit that performs a protection operation for preventing damage to the main power conversion circuit when the monitoring unit determines that the alarm signal is output from the alarm signal output unit.

2. The motor control apparatus according to claim 1, wherein
   the monitoring unit distinguishes a content of an abnormality occurring in the counter electromotive force protection circuit, based on the alarm signal output from the alarm signal output unit.

3. The motor control apparatus according to claim 2, further comprising
   a recording unit that records the content of the abnormality distinguished by the monitoring unit.

4. The motor control apparatus according to claim 2, further comprising
   a display unit that displays the content of the abnormality distinguished by the monitoring unit.

5. The motor control apparatus according to claim 2, further comprising
   an external device control unit that performs control in such a way as to cause an external device to record or display the content of the abnormality distinguished by the monitoring unit.

6. The motor control apparatus according to claim 1, wherein,
   when the monitoring unit determines that the alarm signal is output from the alarm signal output unit, the protection operation unit controls a power conversion operation by the main power conversion circuit in such a way that acceleration/deceleration of the motor is set to a value smaller than a value before the determination by the monitoring unit.

7. The motor control apparatus according to claim 1, wherein,
   when the monitoring unit determines that the alarm signal is output from the alarm signal output unit, the protection operation unit performs control in such a way as to turn off excitation with respect to the motor.

8. The motor control apparatus according to claim 1, wherein
   the main power conversion circuit includes
   a converter that converts alternating current power supplied from an alternating current input side into direct current power, and outputs the direct current power to a DC link on a direct current output side,
   a DC link capacitor provided in the DC link, and
   an inverter that converts direct current power in the DC link into alternating current power for driving the motor, and outputs the alternating current power.

* * * * *